(12) United States Patent
Chowdhry et al.

(10) Patent No.: US 7,750,096 B2
(45) Date of Patent: *Jul. 6, 2010

(54) METHOD FOR EMULSION POLYMERIZING OLEFINS

(75) Inventors: Mubarik Mahmood Chowdhry, Strasbourg (FR); Ulrich Nieken, Neustadt (DE); Monica Haag, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 832 days.

This patent is subject to a terminal disclaimer.

(21) Appl. No.: 10/566,653

(22) PCT Filed: Jul. 8, 2004

(86) PCT No.: PCT/EP2004/007469

§ 371 (c)(1),
(2), (4) Date: Nov. 21, 2006

(87) PCT Pub. No.: WO2005/014668

PCT Pub. Date: Feb. 17, 2005

(65) Prior Publication Data

US 2007/0167566 A1  Jul. 19, 2007

(30) Foreign Application Priority Data

Aug. 1, 2003  (DE) ............... 103 35 990

(51) Int. Cl.
C08F 4/42 (2006.01)
C08F 4/06 (2006.01)

(52) U.S. Cl. ............ 526/172; 526/91; 526/100; 526/98

(58) Field of Classification Search ......... 524/785, 524/804; 526/172, 142, 348, 91, 100, 98; 502/103, 125

See application file for complete search history.

(56) References Cited

U.S. PATENT DOCUMENTS

| | | | | | |
|---|---|---|---|---|---|
| 4,620,021 | A | * | 10/1986 | Starzewski et al. | ............ 556/19 |
| 4,824,934 | A | * | 4/1989 | van Broekhoven et al. | .. 528/392 |
| 5,574,091 | A | | 11/1996 | Walther et al. | |
| 6,160,049 | A | * | 12/2000 | Mathauer et al. | ............ 524/804 |
| 6,559,326 | B1 | * | 5/2003 | Kristen et al. | ............... 556/21 |
| 7,378,474 | B2 | * | 5/2008 | Fukui | ............... 526/172 |
| 7,417,098 | B2 | * | 8/2008 | Chowdhry et al. | ......... 526/172 |
| 2005/0261452 | A1 | * | 11/2005 | Chowdhry et al. | ......... 526/172 |
| 2008/0182915 | A1 | * | 7/2008 | Chowdhry et al. | ........... 521/65 |

FOREIGN PATENT DOCUMENTS

| | | |
|---|---|---|
| DE | 102 34 005 | 2/2004 |
| WO | 03/006528 | 1/2003 |

OTHER PUBLICATIONS

Bauers, et al. Macromolecules 2003, 36(18), 6711-6715. Published online Aug. 7, 2003.*

* cited by examiner

*Primary Examiner*—Mark Eashoo
*Assistant Examiner*—Michael A Salvitti
(74) *Attorney, Agent, or Firm*—Oblon, Spivak, McClelland, Maier & Neustadt, L.L.P.

(57) ABSTRACT

An aqueous polymer dispersion is prepared by reacting at least one olefin in the presence of at least one polymerization catalyst and one emulsifier in an aqueous medium by a process wherein the polymerization catalyst is prepared in an in situ reaction by reacting the ligand compound 2,6-dichloro-para-benzoquinone (Ia) and/or 2,3,6-trichloro-para-benzoquinone (Ib) with a phosphine compound or diphosphine compound and with a metal compound and the polymerization reaction is effected in an aqueous medium.

18 Claims, No Drawings

METHOD FOR EMULSION POLYMERIZING OLEFINS

The present invention relates to a process for the preparation of an aqueous polymer dispersion by reacting at least one olefin in the presence of at least one polymerization catalyst and one emulsifier in an aqueous medium, wherein the polymerization catalyst is produced in an in situ reaction by reacting the ligand compound 2,6-dichloro-para-benzoquinone (Ia) and/or 2,3,6-trichloro-para-benzoquinone (Ib)

with a phosphine compound. $PR_3'$, where R' is hydrogen, $C_1$-$C_{12}$-alkyl, $C_3$-$C_{12}$-cycloalkyl, $C_7$-$C_{15}$-aralkyl or $C_6$-$C_{14}$-aryl, or with a diphosphine compound $R_2'P$-G-$PR_2'$, where R' has the same meanings as in the phosphine compounds $PR_3'$ and G is a divalent radical, such as $C_1$-$C_{12}$-alkylene, $C_3$-$C_{12}$-cycloalkylene, $C_7$-$C_{15}$-aralkylene or $C_6$-$C_{14}$-arylene, and with a metal compound of the formula $M(L^2)_2$ or $M(L^2)_2(L^1)_z$, where:

M is a transition metal of groups 7 to 10 of the Periodic Table of the Elements, $L^1$ are phosphanes $(R^1)_xPH_{3-x}$ or amines $(R^1)_xNH_{3-x}$ having identical or different radicals $R^1$, diamines, ethers $(R^1)_2O$, water, alcohols $(R^1)OH$, pyridine, pyridine derivatives of the formula $C_5H_{5-x}(R^1)_xN$, carbon monoxide, $C_1$-$C_{12}$-alkylnitriles, $C_6$-$C_{14}$-arylnitriles or ethylenically unsaturated double bond systems, where x is an integer from 0 to 3, $R^1$ is hydrogen or $C_1$-$C_{20}$-alkyl, which in turn may be substituted by $O(C_1$-$C_6$-alkyl) or $N(C_1$-$C_6$-alkyl)$_2$, or is $C_3$-$C_{12}$-cycloalkyl, $C_7$-$C_{15}$-aralkyl or $C_6$-$C_{14}$-aryl, $L^2$ are halide ions, $R^2_xNH_{3-x}$, where x is an integer from 0 to 3 and $R^2$ is $C_1$-$C_{12}$-alkyl, and furthermore $C_1$-$C_6$-alkyl anions, allyl anions, benzyl anions or aryl anions, where $L^1$ and $L^2$ may be linked to one another by one or more covalent bonds, z is from 0 to 4, and the polymerization of the at least one olefin is effected in an aqueous medium which comprises at least 50% by volume of water.

Isolation and purification of the complex formed in situ are dispensed with.

Aqueous dispersions of polymers are utilized commercially in a large number of very different applications. Examples are paper applications (coating and surface sizing), raw materials for surface coatings and finishes, adhesive raw materials (including contact adhesives), textile and leather applications, in construction chemistry, molded foams (mattresses, carpet backings) and for medical and pharmaceutical products, for example as binders for preparations. A summary is to be found in D. Distler (Editor), Wäβrige Polymerdispersionen, Wiley-VCH Verlag, 1st Edition, 1999.

It has been difficult to date to prepare aqueous dispersions of polyolefins. However, it would be desirable to be able to provide such aqueous dispersions of polyolefins because the monomers, such as ethylene or propylene, are very advantageous from economic aspects.

The conventional processes for the preparation of such aqueous dispersions from the corresponding olefins make use of either free radical high-pressure polymerization or the preparation of secondary dispersions.

These processes have disadvantages. The free radical polymerization processes require extremely high pressures and are limited on an industrial scale to ethylene and ethylene copolymers, and the required apparatuses are very expensive to procure and maintain. Another possibility comprises first polymerizing ethylene in any desired process and then preparing a secondary dispersion, as described in U.S. Pat. No. 5,574,091. This method is a multistage process and therefore very expensive.

It is therefore desirable to polymerize olefins, such as ethylene or propylene, under the conditions of an emulsion polymerization and to prepare the required aqueous dispersion in one step from the corresponding olefin. Moreover, emulsion polymerization processes very generally have the disadvantage that they give polymers having high molar masses, the heat removal being readily controllable as a result of the process. Finally, reactions in aqueous systems very generally are therefore of interest because water is a cheap and environmentally friendly solvent.

Processes presented to date for the emulsion polymerization of olefins, such as ethylene or propylene, require further improvement. In general, the problem is associated with the catalyst required for the polymerization of these monomers.

Owing to the considerable commercial importance of the polyolefins, a search for improved polymerization processes continues to be of major importance.

A good overview of the prior art on the polymerization of olefins in an aqueous medium, in particular using polymerization catalysts prepared in situ, is given by the non-prior-published Patent Application with the Application Number 10234005.6, filed by the Applicant at the German Patent and Trademark Office. This Application, which is hereby incorporated by reference, relates to the broad use of special quinoid ligand compounds and special transition metal compounds for the in situ preparation of polymerization catalysts and the use thereof in the polymerization of olefins in an aqueous medium. The in situ catalysts used in the examples were prepared using 2,3,5,6-tetrachloro-para-benzoquinone and 2,3,5,6-tetrabromo-para-benzoquinone as ligand compounds. However, the activities of the in situ catalysts prepared using abovementioned quinone compounds are not completely satisfactory since the aqueous polymer dispersions obtained only have solids contents of from 8 (1-butene/ethylene) to 18% by weight (ethylene).

It is an object of the present invention to provide an improved process which gives aqueous polymer dispersions having higher solids contents.

We have found that this object is achieved by the process defined at the outset.

Examples of the at least one olefin which can be used for the novel polymerization are: ethylene, propylene, 1-butene, 1-pentene, 1-hexene, 1-heptene, 1-octene, 1-decene and 1-eicosene, but also branched olefins, such as 4-methyl-1-pentene, vinylcyclohexene and vinylcyclohexane, and styrene, para-methylstyrene and para-vinylpyridine, ethylene and propylene being preferred. Ethylene is particularly preferred.

In addition to one of the abovementioned main olefins, at least one further olefin may be used as a comonomer for the polymerization in the novel process, it being possible to select the at least one comonomer from the following groups:

ethylene and 1-olefins, such as propylene, 1-butene, 1-pentene, 1-hexene, 1-heptene, 1-octene, 1-decene and 1-eicosene, but also branched olefins, such as 4-methyl-1-pentene, vinylcyclohexene and vinylcyclohexane, and styrene, para-methylstyrene and para-vinylpyridine, propylene, 1-butene, 1-pentene, 1-hexene, 1-heptene, 1-octene and 1-decene being preferred;

internal olefins, such as norbornene, norbornadiene or cis- or trans-2-butene;

polar monomers, such as acrylic acid, $C_1$-$C_8$-alkyl acrylates, 2-hydroxyethyl acrylate, 3-hydroxypropyl acrylate, 4-hydroxybutyl acrylate, methacrylic acid, $C_1$-$C_8$-alkyl methacrylate, $C_1$-$C_6$-alkyl vinyl ethers and vinyl acetate; acrylic acid, methyl acrylate, ethyl acrylate, n-butyl acrylate, 2-ethylhexyl acrylate, 2-hydroxyethyl acrylate, methyl methacrylate, ethyl methacrylate, n-butyl methacrylate, ethyl vinyl ether and vinyl acetate are preferred.

The ratio of the main olefin to the at least one comonomer can be freely chosen, the main olefin being used in an amount of $\geq 50$ mol % in the mixture to be polymerized, and the total amount of the at least one comonomer being $\leq 50$ mol %. Frequently, however, only one main olefin is used for the polymerization. With the use of at least one comonomer, the total amount of comonomer is often $\leq 40$ mol %, $\leq 30$ mol %, $\leq 20$ mol % or $\leq 10$ mol %, and $\geq 0.1$ mol %, $\geq 0.5$ mol % $\geq 1$ mol %, $\geq 5$ mol % or $\geq 10$ mol %, and all values in between.

The synthesis of the ligand compounds Ia and Ib is known per se to a person skilled in the art. Furthermore, the two ligand compounds Ia and Ib are commercially available.

The ligand compounds Ia and Ib can be used alone or as mixtures. The molar ratios of Ia to Ib are therefore from 0:100 to 100:0 mol %. Often, the molar ratios are 0:100 mol %, 10:90 mol %, 50:50 mol %, 90:10 mol % or 100:0 mol % and all values in between.

The ligand compounds Ia and/or Ib are combined with a phosphine compound $PR_3'$, where R' is hydrogen, $C_1$-$C_{12}$-alkyl, $C_3$-$C_{12}$-cycloalkyl, $C_7$-$C_{15}$-aralkyl or $C_6$-$C_{14}$-aryl. A particularly preferably used phosphine compound is triphenylphosphine.

Instead of the phosphine compound $PR_3'$, it is also possible to use the diphosphine compound $R_2'P$-$G$-$PR_2'$, where R' has the same meanings as in the phosphine compounds $PR_3'$ and G is a divalent radical, such as $C_1$-$C_{12}$-alkylene, $C_3$-$C_{12}$-cycloalkylene, $C_7$-$C_{15}$-aralkylene or $C_6$-$C_{14}$-arylene.

Such phosphine compounds can be prepared by conventional syntheses of organic chemistry and are also commercially available.

The molar ratio of ligand compound Ia and/or Ib to the abovementioned phosphine compound is from 1:100 to 100:1, often from 1:50 to 50:1 or from 1:10 to 10:1 and frequently from 1:4 to 4:1 and all values in between.

The ligand compounds Ia and/or Ib are also combined with one or more metal compounds of the formula $M(L^2)_2$ or $M(L^2)_2(L^1)_z$, in addition to the phosphine compound. Here, the variables are defined as follows:

$L^1$ is selected from phosphanes of the formula $(R^1)_xPH_{3-x}$ or amines of the formula $(R^1)_xNH_{3-x}$, where x is an integer from 0 to 3, and diamines, such as ethylenediamine, propylenediamine or tetramethylenediamine. However, ethers $(R^1)_2O$, such as diethyl ether or tetrahydrofuran, water, alcohols $(R^1)OH$, such as methanol or ethanol, pyridine, pyridine derivatives of the formula $C_5H_{5-x}(R^1)_xN$, for example 2-picoline, 3-picoline, 4-picoline, 2,3-lutidine, 2,4-lutidine, 2,5-lutidine, 2,6-lutidine or 3,5-lutidine, carbon monoxide, $C_1$-$C_{12}$-alkylnitriles or $C_6$-$C_{14}$-arylnitriles, such as acetonitrile, propionitrile, butyronitrile or benzonitrile, are also suitable. Furthermore, monoethylenically or polyethylenically unsaturated double bond systems, such as ethenyl, propenyl, cis-2-butenyl, trans-2-butenyl, cyclohexenyl or norbornenyl, may serve as ligands.

$R^1$ is selected from hydrogen and $C_1$-$C_{20}$-alkyl, which in turn may be substituted by $O(C_1$-$C_6$-alkyl) or $N(C_1$-$C_6$-alkyl)$_2$, and from $C_3$-$C_{12}$-cycloalkyl, $C_7$-$C_{15}$-aralkyl and $C_6$-$C_{14}$-aryl.

$L^2$ is selected from
halide ions, such as fluoride, chloride, bromide or iodide, preferably chloride or bromide,
amines $(R^2)_xNH_{3-x}$, where x is an integer from 0 to 3 and $R^2$ is $C_1$-$C_{12}$-alkyl,
$C_1$-$C_6$-alkyl anions, such as Me$^-$, $(C_2H_5)^-$, $(C_3H_7)^-$, $(n$-$C_4H_8)^-$, $(tert$-$C_4H_9)^-$ or $(C_6H_{14})^-$,
allyl anions or methallyl anions,
benzyl anions or
aryl anions, such as $(C_6H_5)^-$;
M is a transition metal of groups 7 to 10 of the Periodic Table of the Elements; manganese, iron, cobalt, nickel and palladium are preferred and nickel is particularly preferred.
z is an integer from 0 to 4.

In this document, alkyl groups are understood as meaning linear or branched alkyl radicals of 1 to 20 carbon atoms, for example methyl, ethyl, n-propyl, isopropyl, n-butyl, 1-methylpropyl, 2-methylpropyl, n-pentyl, 1-methylbutyl, 2-methylbutyl, 3-methylbutyl, 1-ethylpropyl, 2-ethylpropyl, 1,1-dimethylpropyl, 2,2-dimethylpropyl, 1,2-dimethylpropyl, n-hexyl, 1-methylpentyl, 2-methylpentyl, 3-methylpentyl, 4-methylpentyl, 1-ethylbutyl, 2-ethylbutyl, 3-ethylbutyl, 1,1-dimethylbutyl, 2,2-dimethylbutyl, 3,3-dimethylbutyl, 1,2-dimethylbutyl, 1,3-dimethylbutyl, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, 4-ethylpentyl, 1,1-dimethylpentyl, 2,2-dimethylpentyl, 3,3-dimethylpentyl, 4,4-dimethylpentyl, 1,2-dimethylpentyl, 1,3-dimethylpentyl, 1,4-dimethylpentyl, 2,3-dimethylpentyl, 2,4-dimethylpentyl, n-octyl, 1-methylheptyl, 2-methylheptyl, 3-methylheptyl, 4-methylheptyl, 5-methylheptyl, 6-methylheptyl, 1-ethylhexyl, 2-ethylhexyl, 3-ethylhexyl, 4-ethylhexyl, 5-ethylhexyl, 1,1-dimethylhexyl, 2,2-dimethylhexyl, 3,3-dimethylhexyl, 4,4-dimethylhexyl, 5,5-dimethylhexyl, 1,2-dimethylhexyl, 1,3-dimethylhexyl, 1,4-dimethylhexyl, 1,5-dimethylhexyl, 2,3-dimethylhexyl, 2,4-dimethylhexyl, 2,5-dimethylhexyl, 3,4-dimethylhexyl, 3,5-dimethylhexyl and the higher homologs and the isomers thereof.

In this document, cycloalkyl groups are understood as meaning monocyclic, saturated hydrocarbon groups having from 3 to 12 carbon ring members, for example cyclopropyl, cyclobutyl, cyclopentyl, cyclohexyl, cycloheptyl, cyclooctyl, cyclononyl, cyclodecyl, cycloundecyl or cyclododecyl.

The aralkyl groups are organic radicals having from 6 to 10 carbon atoms in the aryl moiety and from 1 to 9 carbon atoms in the alkyl moiety. The preferred aralkyl group is benzyl.

An aryl group is understood as meaning a mononuclear to trinuclear aromatic ring system comprising from 6 to 14 carbon ring members, for example phenyl, naphthyl or anthracenyl.

The alkylene, cycloalkylene, aralkylene or arylene groups are divalent functional groups which are derived from the corresponding abovementioned alkyl, cycloalkyl, aralkyl or aryl groups.

In a preferred embodiment, $L^1$ and $L^2$ are linked to one another by one or more covalent bonds. Examples of such ligands are 1,5-cyclooctadienyl ligands (COD), 1,6-cyclodecenyl ligands and 1,5,9-all-trans-cyclododecatrienyl ligands.

In a further particular embodiment, $L^1$ is tetramethylethylenediamine (TMEDA).

Very particularly preferred metal compounds are $Ni(COD)_2$ and $Ni(CH_3)_2(TMEDA)$.

The conditions for the reaction of the ligand compound or compounds Ia and/or Ib with the metal compound and the phosphine compound are not critical per se. Usually, they are reacted at from 0 to 100° C. in a solvent which may be selected from aliphatic or aromatic hydrocarbons, for example n-heptane, toluene, ethylbenzene, ortho-xylene, meta-xylene or para-xylene. Other suitable solvents are chlorobenzene, and furthermore ketones, for example acetone, acyclic or cyclic ethers, for example diethyl ether, diisopropyl ether, 1,4-dioxane or tetrahydrofuran, water or alcohols, for example methanol or ethanol.

Molar ratios of metal compound to phosphine compound which have proven useful are ratios of from 1:1000 to 1000:1, preferably from 1:10 to 10:1, particularly preferably from 1:2 to 2:1, and all values in between.

It is possible to react the metal compound with the chosen organic ligands and the phosphine compound outside the polymerization reactor and then to introduce the reaction solution into the polymerization reactor.

The reaction of metal compound, phosphine compound and ligand compound is preferably effected inside the polymerization reactor, and it may be advantageous also to add or initially take other substances, for example further solvents, olefins to be polymerized and other assistants, for example emulsifiers.

The choice of the reaction conditions depends in each case on the substances used. Particularly in the case of water-sensitive precursors, it has proven advantageous first to react the precursors outside the polymerization reactor in an organic solvent and then to meter the reaction product into the polymerization reactor.

This procedure is also advantageous when the precursors do not dissolve completely in the solvent used but the reaction product does.

Isolation and purification of the complexes formed in situ are dispensed with.

The complexes produced in situ are very suitable for use in the polymerization or copolymerization of olefins in water or in a solvent mixture which comprises at least 50% by volume of water.

The polymerization is carried out in the presence of an emulsifier which keeps both the liquid olefins and the polymer particles formed, and if appropriate the poorly water-soluble solvent present, dispersed in the aqueous phase.

In some cases, the polymerization catalyst formed in situ can be activated by ethylene. The ease of the actuation reaction depends decisively on the nature of the ligand $L^1$. Thus, it was possible to show that, where $L^1$ is, for example, a tetramethylethylenediamine ligand, the activation takes place particularly readily.

The polymerization of the olefins by the novel process can be carried out in a manner known per se.

The order of addition of the reagents in the novel process is not critical. Thus, first gaseous monomer can be forced under pressure onto the solvent, or liquid monomer can be metered in, and the mixture of ligand, phosphine compound and metal compound is then added. However, it is also possible first to dilute the mixture of ligand, phosphine compound and metal compound with further solvent and then to add monomer.

The actual polymerization usually takes place at a minimum pressure of 1 bar; below this pressure, the polymerization rate is too low. 2 bar are preferred, and a minimum pressure of 10 bar is particularly preferred.

4 000 bar may be mentioned as a maximum pressure; at higher pressures, the requirements with respect to the material of the polymerization reactor are very high, and the process becomes uneconomical. 100 bar are preferred and 50 bar are particularly preferred (in each case the gage pressures are stated).

The polymerization temperature can be varied within a wide range. 10° C. may be mentioned as a minimum temperature, since the polymerization rate decreases at lower temperatures. A minimum temperature of 40° C. is preferred, particularly preferably 65° C. 350° C. may be mentioned as an expedient maximum temperature, and 150° C. are preferred and 100° C. particularly preferred.

Suitable organic solvents are aromatic solvents, such as benzene, toluene, ethylbenzene, ortho-xylene, meta-xylene and para-xylene, and mixtures thereof. Cyclic ethers, such as tetrahydrofuran and dioxane, or acyclic ethers, such as diethyl ether, di-n-butyl ether, diisopropyl ether or 1,2-dimethoxyethane, are furthermore suitable. Ketones, such as acetone, methyl ethyl ketone and diisobutyl ketone, and amides, such as dimethylformamide or dimethylacetamide, are also suitable. Furthermore, mixtures of these solvents with one another and mixtures of these solvents with water or alcohols, such as methanol or ethanol, are suitable.

Frequently, mixtures of acetone and water are used as solvents.

The amount of the solvent is also not critical, but it must be ensured that the complex formed in situ is capable of dissolving completely, since otherwise lower activities are to be expected. The dissolution process can, if required, be accelerated by ultrasound treatment.

The emulsifier which is likewise to be added can be dissolved in a further portion of the solvent or together with the ligand compound or the metal compound.

The amount of the emulsifier is chosen so that the mass ratio of monomer to emulsifier is greater than 1, preferably greater than 10, particularly preferably greater than 20. Moreover, the amount of emulsifier must be such that it is sufficient to keep the resulting polymer particles dispersed in the aqueous medium. Frequently, the amount of emulsifier is from 0.01 to 5 parts by weight, based on 100 parts by weight of water.

The ligand compounds Ia and/or Ib can act by themselves as emulsifiers. However, the activity in the polymerization is substantially increased if an additional emulsifier is added. This emulsifier may be ionic or nonionic.

Customary nonionic emulsifiers are, for example, ethoxylated mono-, di- and trialkylphenols (degree of ethoxylation: from 3 to 50, alkyl radical: $C_4$-$C_{12}$) and ethoxylated fatty alcohols (degree of ethoxylation: from 3 to 80; alkyl radical: $C_8$-$C_{36}$). Examples of these are the Lutensol® grades from BASF AG or the Triton® grades from Union Carbide.

Conventional anionic emulsifiers are, for example, alkali metal and ammonium salts of alkylsulfates (alkyl radical: $C_8$ to $C_{12}$), of sulfuric monoesters of ethoxylated alkanols (degree of ethoxylation: from 4 to 30, alkyl radical: $C_{12}$-$C_{18}$) and of ethoxylated alkylphenols (degree of ethoxylation: from 3 to 50, alkyl radical: $C_4$-$C_{12}$), of alkanesulfonic acids (alkyl radical: $C_{12}$-$C_{18}$) and of alkylarylsulfonic acids (alkyl radical: $C_9$-$C_{18}$).

Suitable cationic emulsifiers are as a rule primary, secondary, tertiary or quaternary ammonium salts, alkanolammonium salts, pyridinium salts, imidazolinium salts, oxazolinium salts, morpholinium salts and thiozolinium salts having a $C_8$-$C_{18}$-alkyl, $C_6$-$C_{18}$-aralkyl or heterocyclic radical and salts of amine oxides, quinolinium salts, isoquinolinium salts, tropylium salts, sulfonium salts and phosphonium salts. Examples are dodecylammonium acetate and the corresponding hydrochloride, the chlorides and acetates of the various 2-(N,N,N-trimethylammonium)ethylparaffinic acid esters, N-cetylpyridinium chloride, N-laurylpyridinium sulfate and N-cetyl-N,N,N-trimethylammonium bromide, N-dodecyl-N,N,N-trimethylammonium bromide, N,N-distearyl-N,N-dimethylammonium chloride and the gemini surfactant N,N'-(lauryldimethyl)ethylenediamine dibromide. Numerous further examples are to be found in H. Stache, Tensid- Taschenbuch, Carl-Hanser-Verlag, Munich, Vienna, 1981, and in McCutcheon's, Emulsifiers & Detergents, MC Publishing Company, Glen Rock, 1989.

Nonionic and/or anionic emulsifiers are preferably used, particularly preferably anionic emulsifiers.

Stirred kettles and autoclaves as well as tubular reactors have proven useful as polymerization reactors, it being possible for the tubular reactors to be in the form of a loop reactor.

The olefin or olefins to be polymerized is or are mixed in the polymerization medium. Water or a mixture of water with the abovementioned solvents may be used as the polymerization medium. It should be ensured that the proportion of water is at least 50, preferably at least 90, particularly preferably at least 95, % by volume, based on the total mixture.

The solutions of the complex produced in situ and if appropriate of the emulsifier are combined with the mixture of olefin and aqueous polymerization medium. The order of addition of the various components is not critical per se. However, it is necessary for the combination of the components to be carried out sufficiently rapidly so that no crystallization of any poorly soluble complex compounds occurring as intermediates takes place.

Suitable polymerization processes are in principle continuous and batchwise processes. Semibatch processes in which, after mixing of all components, olefin or an olefin mixture is subsequently metered in the course of the polymerization are preferred.

Aqueous polymer dispersions are obtained by the novel process.

The mean particle diameters of the polymer particles in the dispersions obtainable according to the invention are from 10 to 1 000 nm, preferably from 50 to 500 nm, particularly preferably from 70 to 350 nm. The distribution of the particle diameter can, but need not, be very uniform. For some applications, in particular for those involving high solids contents (>55%), broad or bimodal distributions are even preferred.

What is important is that the novel process can advantageously be carried out by the miniemulsion polymerization method. According to the invention, poorly water-soluble organic solvent can then also optionally be used. Suitable poorly water-soluble solvents are liquid aliphatic and aromatic hydrocarbons of 5 to 30 carbon atoms, for example n-pentane and isomers, cyclopentane, n-hexane and isomers, cyclohexane, n-heptane and isomers, n-octane and isomers, n-nonane and isomers, n-decane and isomers, n-dodecane and isomers, n-tetradecane and isomers, n-hexadecane and isomers, n-octadecane and isomers, eicosane, benzene, toluene, ethylbenzene, cumene, ortho-, meta- and para-xylene, mesitylene and generally hydrocarbon mixtures having a boiling range of from 30 to 250° C. Hydroxy compounds, such as saturated and unsaturated fatty alcohols of 10 to 28 carbon atoms, for example n-dodecanol, n-tetradecanol, n-hexadecanol and the isomers thereof, or cetyl alcohol, esters, for example fatty esters having 10 to 28 carbon atoms in the acid moiety and 1 to 10 carbon atoms in the alcohol moiety, or esters of carboxylic acids and fatty alcohols having 1 to 10 carbon atoms in the carboxylic acid moiety and 10 to 28 carbon atoms in the alcohol moiety can also be used. Of course, it is also possible to use mixtures of the abovementioned solvents.

The total amount of poorly water-soluble organic solvent is up to 15, preferably from 0.001 to 10, particularly preferably from 0.01 to 5, parts by weight, based in each case on 100 parts by weight of water.

It is advantageous if the solubility of the poorly water-soluble solvent or of the solvent mixture under reaction conditions in the aqueous reaction medium is as far as possible $\leq 50$, $\leq 40$, $\leq 30$, $\leq 20$ or $\leq 10\%$ by weight, based in each case on the total amount of solvent.

Solvents are used in particular when the olefins to be used for the polymerization are gaseous under reaction conditions (pressure/temperature), as is the case, for example, for ethene, propene, 1-butene and/or isobutene.

It is advantageous if, in the miniemulsion process, the total amount of ligand compound Ia and/or Ib, of the phosphine compound and of the metal salt is dissolved or reacted in a portion or in the total amount of the liquid, slightly water-soluble olefin and/or of the poorly water-soluble organic solvent. The portion or the total amount of the slightly water-soluble olefin and/or of the poorly water-soluble organic solvent, in which the polymerization catalyst formed in situ is present in dissolved or at least dispersed form, is then dispersed in the presence of emulsifier in the aqueous medium as the disperse phase having a mean droplet diameter of $\leq 1\ 000$ nm, and any remaining amount of olefin is added continuously or batchwise at the reaction temperature.

The novel process is frequently carried out in such a way that, in a first step, the total amount of the metal compound, of the ligand compound Ia and/or Ib and of the phosphine compound is dissolved in a portion or the total amount of the poorly water-soluble olefin and/or of the poorly water-soluble organic solvent and reacted to give the polymerization catalyst. This solution is then dispersed together with an emulsifier in an aqueous medium with formation of oil-in-water dispersions having a mean droplet diameter of $>1\ 000$ nm, i.e. the macroemulsions. These macroemulsions are then converted by known measures into oil-in-water emulsions having a mean droplet diameter of $\leq 1\ 000$ nm, i.e. the miniemulsions, and any remaining amount or the total amount of the olefin to be polymerized is added to said miniemulsions at reaction temperature.

The mean size of the droplets of the disperse phase of the oil-in-water emulsions to be used according to the invention can be determined according to the principle of quasielastic dynamic light scattering (the z-average droplet diameter $d_z$ of the monomodal analysis of the autocorrelation function), for example using a Coulter N4 Plus Particle Analyser from Coulter Scientific Instruments.

According to the invention, the $d_z$ values determined in this manner for the miniemulsions are usually $\leq 700$ nm, frequently $\leq 500$ nm. The $d_z$ range from 100 to 400 nm or from 100 to 300 nm is advantageous according to the invention. Usually, $d_z$ of the aqueous miniemulsion to be used according to the invention is $\geq 40$ nm.

The general preparation of aqueous miniemulsions from aqueous macroemulsions is known to a person skilled in the art (cf. P. L. Tang, E. D. Sudol, C. A. Silebi and M. S. El-Aasser in Journal of Applied Polymer Science, 43 (1991), 1059 to 1066. Usually, the macroemulsions for the preparation of miniemulsions are exposed to strong shearing. Such strong shearing can be achieved, for example, by high-pressure homogenization, by ultrasound or by jet dispersers. The formation of a miniemulsion is preferably effected by ultrasonic treatment.

The polymers obtained by the novel process have technically interesting properties. In the case of polyethylene, they may have high crystallinity, which is detectable, for example, through the number of branches. Frequently less than 40, preferably less than 20, particularly preferably less than 10, branches are found per 1 000 carbon atoms of the polymer, determined by $^1$H-NMR and $^{13}$C-NMR spectroscopy.

The molecular weight distributions of the polyolefins obtainable by the novel process, i.e. the Q values, are from 1.0 to 50, preferably from 1.5 to 10. The molar masses of the polyolefins obtained are from 1 000 to 1 000000, in particular from 3 000 to 150 000 (number average).

An advantage of the dispersions obtainable by the novel process, in addition to the favorable price owing to the cheap olefins and processes, is that they are more stable to weathering than dispersions of polybutadiene or butadiene copolymers. Compared with dispersions of polymers having acrylates or methacrylates as the main monomer, the lower tendency to hydrolyze may be mentioned as being advantageous. Furthermore, it is advantageous that most olefins are readily volatile, and unpolymerized residual monomer can be easily removed. Finally, it is advantageous that there is no need to add molar mass regulators, for example tert-dodecyl mercaptan, during the polymerization, which regulators on the one hand are difficult to separate off and, on the other hand, have an unpleasant odor. Furthermore, it is advantageous that the aqueous dispersions obtained from the novel process have relatively high solids contents of up to more than 30% by weight.

The polymer particles as such can be obtained from the initially obtained aqueous dispersions by removing the water and, if required, the organic solvent or solvents. Numerous conventional methods are suitable for removing the water and, if required, the organic solvent or solvents, for example filtration, spray-drying or evaporation. The polymers thus obtained have a good morphology and a high bulk density.

The particle size can be determined by light scattering methods. An overview is to be found in D. Distler (Editor), Wäßrige Polymerdispersionen, Wiley-VCH Verlag, 1st Edition, 1999, Chapter 4.

The dispersions prepared by the novel process can advantageously be used in numerous applications, for example paper applications, such as paper coating or surface sizing, and furthermore surface coatings and finishes, construction chemicals, adhesive raw materials, molded foams, textile and leather applications, carpet backings, mattresses or pharmaceutical applications.

WORKING EXAMPLES

General: Unless stated otherwise, the syntheses were carried out by the Schlenk method in the absence of air and moisture.

The molar masses of the polymers obtained were determined by means of GPC.

On the basis of DIN 55672, the following conditions were chosen: solvent: 1,2,4-trichlorobenzene, flow rate: 1 ml/min; temperature: 140° C. The measurement was carried out in a Waters 150 C apparatus which had been calibrated with polyethylene standards.

The solids content was determined by precipitation of the polyolefins with methanol.

Example 1

55 mg (258 µmol) of 2,3,6-trichloro-para-benzoquinone (Ib) and 68 mg (258 µmol) of triphenylphosphine were dissolved at from 20 to 25° C. (room temperature) in 1 ml of anhydrous and degassed methanol, 4 ml of anhydrous and degassed toluene and 0.3 ml of degassed hexadecane. The solution thus obtained was stirred for 20 minutes, after which it had an orange color. The solution was then added to another Schlenk flask which comprised 79 mg (287 µmol; 1.11 eq) of nickel(cyclooctadienyl)$_2$ [Ni(COD)$_2$].

In the meantime, a solution of 1 g of sodium dodecylsulfate [SDS] and 95 ml of degassed and demineralized water was prepared. 75 ml of this aqueous solution were added directly to the reactor in the absence of oxygen. The remaining aqueous SDS solution was added to the abovementioned organic catalyst mixture, and the aqueous mixture obtained was subjected to an ultrasonic treatment (Bandelin HD2200, with a KE76 probe, 120 W, 2 minutes). The aqueous miniemulsion thus obtained was then added to the reactor with the aid of a Teflon cannula.

The reactor was then filled with ethylene, a constant ethylene pressure of 40 bar being established. At the same time, the reactor content was heated to 70° C. with stirring (1 000 revolutions per minute). After a reaction time of 2 hours at 70° C., the polymerization was stopped by cooling the reactor content to room temperature and letting down to atmospheric pressure.

40 ml of methanol were added to the resulting aqueous latex with stirring, 8.7 g of polyethylene being precipitated (corresponding to a solids content of the aqueous polymer dispersion of 22% by weight). The polyethylene obtained had a number average molecular weight of about 5200 g/mol and a weight average molecular weight of about 13 000 g/mol.

Example 2

Example 2 was carried out analogously to example 1, except that 45 mg (258 µmol) of 2,6-dichloro-para-benzoquinone (Ia) were used instead of 55 mg (258 µmol) of 2,3,6-trichloro-para-benzoquinone (Ib).

The methanol precipitation gave 12.6 g of polyethylene, corresponding to a solids content of the aqueous polymer dispersion of 32% by weight. The polyethylene obtained had a number average molecular weight of about 2 500 g/mol and a weight average molecular weight of about 148 000 g/mol.

Comparative Example 1

In the reaction carried out in an analogous manner in the German Patent Application with the Application Number 10234005.6 using 64 mg (258 µmol) of 2,3,5,6-tetrachloro-para-benzoquinone, 7.1 g of polyethylene, corresponding to a solids content of the aqueous polymer dispersion of 18% by weight, were obtained. The polyethylene obtained had a number average molecular weight of about 6 200 g/mol and a weight average molecular weight of about 18 000 g/mol.

Example 3

55 mg (258 µmol) of 2,3,6-trichloro-para-benzoquinone (Ib) and 68 mg (258 µmol) of triphenylphosphine were dissolved at room temperate in 1 ml of anhydrous and degassed methanol, 4 ml of anhydrous and degassed toluene and 0.3 ml of degassed hexadecane. The solution thus obtained was stirred for 20 minutes, after which it had an orange color. The solution was then added to another Schlenk flask which comprised 79 mg (287 µmol; 1.11 eq) of Ni(COD)$_2$.

In the meantime, a solution was prepared from 1 g of SDS and 95 ml of degassed and demineralized water. 75 ml of this aqueous solution were added directly to the reactor in the absence of oxygen. The remaining aqueous SDS solution was added to the abovementioned organic catalyst mixture, and the aqueous mixture obtained was subjected to an ultrasonic treatment (120 W, 2 minutes). The aqueous miniemulsion thus obtained was then introduced into the reactor with the aid of a Teflon cannula.

The reactor was then filled with 1-butene, a constant 1-butene pressure of 10 bar being established. At the same time, the reactor content was heated to 70° C. with stirring (1 000 revolutions per minute). After 30 minutes, the 1-butene feed was stopped and was replaced by ethylene, which was under a constant pressure of 40 bar.

After a further reaction time of 1.5 hours at 70° C., the polymerization was stopped by cooling to room temperature and letting down the reactor content to atmospheric pressure.

Methanol precipitation gave 24 g of ethylene/1-butene copolymer, corresponding to a solids content of the aqueous polymer dispersion of 15% by weight.

Comparative Example 2

In the reaction carried out in an analogous manner in the German Patent Application with the Application Number 10234005.6 using 64 mg (258 µmol) of 2,3,5,6-tetrachloro-para-benzoquinone, 13 g of copolymer, corresponding to a solids content of the aqueous polymer dispersion of 8% by weight, were obtained.

Example 4

Example 1 was repeated, except that 1 ml of anhydrous and degassed toluene and 3 ml of 1-octene were used instead of 4 ml of anhydrous and degassed toluene.

The aqueous latex obtained had a solids content of 16% by weight. 3 mol % of 1-octene units were detectable in the polymer by NMR spectroscopy.

Example 5

Example 4 was repeated, except that 3 ml of 1-hexene were used instead of 3 ml of 1-octene.

The aqueous latex obtained had a solids content of 18% by weight. 5 mol % of 1-hexene units were detectable in the polymer by NMR spectroscopy.

Example 6

Example 4 was repeated, except that 3 ml of norbornene were used instead of 3 ml of 1-octene.

The aqueous latex obtained had a solids content of 19% by weight. 5 mol % of norbornene units were detectable in the resulting polymer by NMR spectroscopy.

We claim:

1. A process for the preparation of an aqueous polymer dispersion comprising reacting at least one olefin in the presence of at least one polymerization catalyst and one emulsifier in an aqueous medium, wherein the polymerization catalyst is produced in an in situ reaction by reacting the ligand compound 2,6-dichloro-para-benzoquinone (Ia) and/or 2,3,6-trichloro-para-benzoquinone (Ib)

with a phosphine compound $PR_3'$, where R' is hydrogen, $C_1$-$C_{12}$-alkyl, $C_3$-$C_{12}$-cycloalkyl, $C_7$-$C_{15}$-aralkyl or $C_6$-$C_{14}$-aryl, or with a diphosphine compound $R_2'P$-$G$-$PR_2'$, where R' has the same meanings as in the phosphine compounds $PR_3'$ and G is a divalent radical, and with a metal compound of the formula $M(L^2)_2$ or $M(L^2)_2(L^1)_z$, where:

M is a transition metal of groups 7 to 10 of the Periodic Table of the Elements, $L^1$ is selected from the group consisting of phosphanes $(R^1)_xPH_{3-x}$ and amines $(R^1)_xNH_{3-x}$ having identical or different radicals $R^1$, diamines, ethers $(R^1)_2O$, water, alcohols $(R^1)OH$, pyridine, pyridine derivatives of the formula $C_5H_{5-x}(R^1)_xN$, carbon monoxide, $C_1$-$C_{12}$-alkylnitriles, $C_6$-$C_{14}$-arylnitriles and ethylenically unsaturated double bond systems, where x is an integer from 0 to 3, $R^1$ is hydrogen or $C_1$-$C_{20}$-alkyl, which in turn may be substituted by $O(C_1$-$C_6$-alkyl) or $N(C_1$-$C_6$-alkyl)$_2$, or is $C_3$-$C_{12}$-cycloalkyl, $C_7$-$C_{15}$-aralkyl or $C_6$-$C_{14}$-aryl, $L^2$ is selected from the group consisting of halide ions, $R^2_xNH_{3-x}$, where x is an integer from 0 to 3 and $R^2$ is $C_1$-$C_{12}$-alkyl, $C_1$-$C_6$-alkyl anions, allyl anions, benzyl anions and aryl anions, where $L^1$ and $L^2$ may be linked to one another by one or more covalent bonds, z is from 0 to 4, and the polymerization of the at least one olefin is effected in an aqueous medium which comprises at least 50% by volume of water.

2. The process according to claim 1, wherein the polymerization is effected under the conditions of an aqueous miniemulsion polymerization.

3. The process according to claim 1, wherein the polymerization is effected in the presence of an anionic emulsifier.

4. The process according to claim 1, wherein the polymerization is effected in the presence of ethylene.

5. The process according to claim 4, wherein, in addition to ethylene, at least one further olefin which is selected from the group consisting of propylene, 1-butene, 1-hexene, 1-octene, norbornene and styrene is used for the polymerization.

6. The process according to claim 4, wherein exclusively ethylene is used for the polymerization.

7. The process according to claim 1, wherein G is $C_1$-$C_{12}$-alkylene, $C_3$-$C_{12}$-cycloalkylene, $C_7$-$C_{15}$-aralkylene or $C_6$-$C_{14}$-arylene.

8. The process according to claim 1, wherein ligand compound Ia is used to produce the polymerization catalyst.

9. The process according to claim 1, wherein ligand compound Ib is used to produce the polymerization catalyst.

10. The process according to claim 1, wherein ligand compounds Ia and Ib are used to produce the polymerization catalyst.

11. The process according to claim 1, wherein the phosphine compound is used to produce the polymerization catalyst and comprises triphenylphosphine.

12. The process according to claim 1, wherein $L^1$ is present during the production of the polymerization catalyst and comprises tetramethylethylene diamine.

13. The process according to claim 1, wherein the metal compound comprises $Ni(COD)_2$, wherein COD means 1,5-cyclooctadienyl.

14. The process according to claim 1, wherein the metal compound comprises $Ni(CH_3)_2(TMEDA)$, wherein TMEDA means tetramethylethylene diamine.

15. The process according to claim 6, wherein the polyethylene so formed has less than 40 branches per 1,000 carbon atoms thereof, determined by $^1$H-NMR and $^{13}$C-NMR spectroscopy.

16. The process according to claim 6, wherein the polyethylene so formed has less than 20 branches per 1,000 carbon atoms thereof, determined by $^1$H-NMR and $^{13}$C-NMR spectroscopy.

17. The process according to claim 6, wherein the polyethylene so formed has less than 10 branches per 1,000 carbon atoms thereof, determined by $^1$H-NMR and $^{13}$C-NMR spectroscopy.

18. The process according to claim 1, wherein the aqueous polymer dispersion has a solids content that is higher than one obtained using 2,3,5,6-tetrachloro-para-benzoquinone as the ligand compound.

* * * * *